United States Patent
Lambert et al.

(10) Patent No.: US 10,878,030 B1
(45) Date of Patent: Dec. 29, 2020

(54) EFFICIENT VIDEO REVIEW MODES

(71) Applicant: Lytx, Inc., San Diego, CA (US)

(72) Inventors: Daniel Lambert, Carlsbad, CA (US); Chloe Soowon Lee, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 242 days.

(21) Appl. No.: 16/010,843

(22) Filed: Jun. 18, 2018

(51) Int. Cl.
*G06F 17/30* (2006.01)
*G06F 16/738* (2019.01)
*B60R 1/00* (2006.01)
*G06F 16/74* (2019.01)
*G06F 16/783* (2019.01)

(52) U.S. Cl.
CPC .............. *G06F 16/739* (2019.01); *B60R 1/00* (2013.01); *G06F 16/743* (2019.01); *G06F 16/7837* (2019.01); *B60R 2300/302* (2013.01); *B60R 2300/80* (2013.01)

(58) Field of Classification Search
None
See application file for complete search history.

(56) References Cited

U.S. PATENT DOCUMENTS

| | | | |
|---|---|---|---|
| 2012/0105637 A1* | 5/2012 | Yousefi | H04W 4/40 348/148 |
| 2013/0198215 A1* | 8/2013 | Lee | G06F 16/288 707/758 |
| 2014/0337335 A1* | 11/2014 | Gordon | H04N 21/2387 707/736 |
| 2014/0379710 A1* | 12/2014 | Kritt | G11B 27/102 707/736 |
| 2015/0254242 A1* | 9/2015 | Cirrincione | G06F 16/43 707/722 |
| 2015/0262080 A1* | 9/2015 | Zisman | H04L 65/4069 706/12 |
| 2015/0331944 A1* | 11/2015 | Xiao | G06K 9/00744 707/722 |
| 2016/0259497 A1* | 9/2016 | Foss | G06F 3/0482 |
| 2019/0361694 A1* | 11/2019 | Gordon | G06F 1/169 |

* cited by examiner

*Primary Examiner* — Hung D Le
(74) *Attorney, Agent, or Firm* — Van Pelt, Yi & James LLP

(57) ABSTRACT

A system for efficient video browsing includes an interface and a processor. The interface is configured to receive marks for a video, where marks for a video are determined based at least in part on trigger inputs. The processor is configured to determine whether to enter an efficient video browsing mode; and in response to determining to enter the efficient video browsing mode: retrieve a portion of the video based at least in part on the marks; and cause displaying of the portion of the video.

18 Claims, 13 Drawing Sheets

US 10,878,030 B1

EFFICIENT VIDEO REVIEW MODES

BACKGROUND OF THE INVENTION

Technology now enables continuous capture of video from a camera. This generates a tremendous quantity of data and this quantity increases with every additional camera whose data is captured and stored. However, typically the portion of the data that is of interest is difficult to locate within the pool of stored data.

BRIEF DESCRIPTION OF THE DRAWINGS

Various embodiments of the invention are disclosed in the following detailed description and the accompanying drawings.

DETAILED DESCRIPTION

Figure 1:
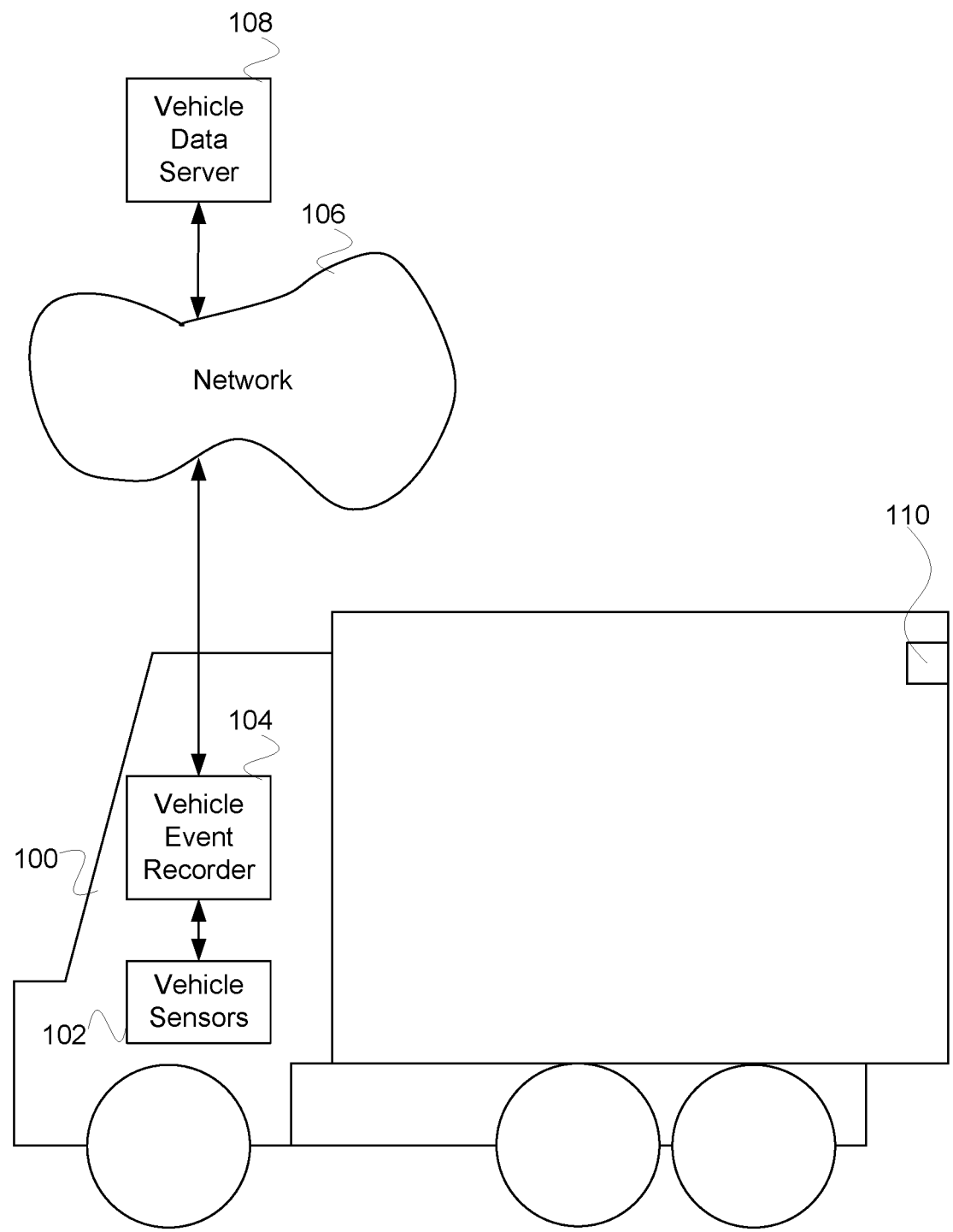
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for efficient video review modes is disclosed. The system comprises an interface and a processor. The interface is configured to receive trigger inputs. The processor is configured to determine marks for a video based at least in part on the trigger inputs; determine whether to enter an efficient video browsing mode; and in response to determining to enter the efficient video browsing mode: 1) retrieve a portion of the video based at least in part on the marks; and 2) cause displaying of the portion of the video. In some embodiments, the processor is coupled to a memory that is configured to store instructions for the processor.

A system for efficient video review modes is disclosed. The system comprises an interface and a processor. The interface is configured to receive marks for video based on trigger inputs. The processor is configured to determine marks for a video based at least in part on the trigger inputs; determine whether to enter an efficient video browsing mode; and in response to determining to enter the efficient video browsing mode: 1) retrieve a portion of the video based at least in part on the marks; and 2) cause displaying of the portion of the video. In some embodiments, the processor is coupled to a memory that is configured to store instructions for the processor.

In various embodiments, a determination of the marks can be either at the vehicle (e.g., from a vehicle event recorder or from integration of the event recorder to a vehicle system or 3$^{rd}$ party equipment such as an electronic logging device (ELD)) and/or on a vehicle data server. As an example, for the case of a system that targets reviewing of loading/unloading of a vehicle, the system can identify marks using a plurality of sources. The vehicle event recorder is able to identify that a delivery occurred based on in vehicle bus signal that indicates that the vehicle transmission is in park and that the cargo door has been opened and/or closed, which can be used to determine a mark. The mark is then to the backend vehicle data server. A corroborating mark is able to be determined from a telematics system that analyzes geo-fence crossings for pickup/delivery identification and then the telematics backend system provides the marks to the vehicle data server using an API call.

In some embodiments, received marks are stored associated with a vehicle and used in an efficient browsing mode. During a review of a cargo pickup or delivery in an efficient review mode, a user is able to select a mark associated with the start, end, or start and end of a pickup/delivery, which allows fast review of the video. The user experience is the same regardless of the source of marks that are provided to the server and stored associated with a vehicle event recorder's data.

The system for efficient video review modes is designed to identify regions of interest within a video data set (e.g., video with respect to an incident). In some cases, identifying regions of interest includes looking for a match of certain condition(s) (e.g., trigger inputs from a vehicle sensor) or a non-match of certain condition(s). For example, for a vehicle carrying a specialized load (e.g., a tanker or hazardous material truck), a mark can be made associated with the video stream that corresponds to trigger conditions (e.g., a dixie gate signal, a brake interlock signal, a safety interlock signal, etc.). The mark can be a notation in video data, a metadata associated with a video file, or any other marking data. In some cases, the trigger is used to identify fuel tanker start/stop of fuel pickup procedure marks, fuel tanker start/stop delivery procedure marks, hazmat start/stop pickup procedure marks, hazmat start/stop delivery procedure marks, or any other appropriate procedure marks. As another example, a vehicle for specialized tasks (e.g., construction vehicles, utility vehicles, telescoping boom vehicles, cherry pickers, bucket trucks, digger derricks, cranes, etc.). The mark can be a notation in video data, a metadata associated with a video file, or any other marking data. In some cases, the trigger is used to identify start of operation marks, stop of operation marks, or any other appropriate marks.

In some cases, various trigger input signals are used to determine trash pickup marks. For example, one or more of the following trigger inputs are used: a waste lift arm pneumatic actuation sensor signal, a waste lift arm electric actuation sensor signal, a radio frequency identifier (RFID), a bin identifier (ID) signal, an accelerometer signal, a following distance signal, a lane departure signal, a rolling stop signal, an engine revolutions per minute (RPM) signal, a speed signal, or any other appropriate signal.

In some cases, various trigger input signals are used to determine distribution, delivery, or long haul trucking marks. For example, one or more of the following trigger inputs are used: a cargo door open signal, a cargo door closed signal, a geofence crossing signal, a passenger pickup signal, an accelerometer signal, a following distance signal, a lane departure signal, a rolling stop signal, an engine RPM signal, a speed signal, or any other appropriate signal.

In some cases, various trigger input signals are used to determine concrete handling or concrete delivery marks. For example, one or more of the following trigger inputs are used: a concrete water adding signal, a concrete pouring signal, a brake interlock signal, an accelerometer signal, a following distance signal, a lane departure signal, a rolling stop signal, an engine RPM signal, a speed signal, or any other appropriate signal.

In some cases, various trigger input signals are used to determine construction vehicle specific marks. For example, one or more of the following trigger inputs are used: a tractor signal that indicates a tillage or other types of tasks, a feller buncher or a harvester signal that indicates delimbing, bucking or loading. These more complex signals may be determined using one or more following low level signals: an engine RPM signal, a speed signal, a vehicle bus signal from specialized machinery, or any other appropriate signal.

In some cases, various trigger input signals are used to determine when a particular military vehicles were engaged in an activity other than driving. For example, one or more following trigger inputs can be used: engine RPM, a speed signal, a vehicle bus signal from specialized machinery, or any other appropriate signal.

The system is an improvement over previous systems in allowing identification of regions of interest based on markings triggered by signals monitored at the vehicle. In addition, review of the video can be specified at a full rate data transmission transfer, sampled rate data transmission transfer, at a regular playback, at accelerated playback, or using any other appropriate display manner. Further, transfer of data from a vehicle event recorder to a server that provides display capability to a user can be made more efficient by only requesting video according to marks (e.g., picking a start time and/or a stop time for a portion of video that is based on the mark preceding by an amount, on the mark, succeeding the mark, between two marks, etc.).

In some cases, specialized indications (e.g., buttons, check boxes, toggles, menu selections, tabs, radio buttons, etc.) enable efficient interaction by a user with a user interface in that marks associated with the video data can be displayed or not based on the specialized indications. These can be used to allow a user rapid access to a desired video. For example, a reviewer would be able to check whether an appropriate procedure was used by a truck operating when loading or unloading fuel/hazardous material by reviewing only video right around marks indicating that the loading or unloading was occurring or likely occurring.

FIG. 1 is a block diagram illustrating an embodiment of a system including a vehicle event recorder. In the example shown, vehicle sensors 102 provide signals to vehicle event recorder 104. Depending on one or more signals from vehicle sensors 102 or vehicle event recorder 104 sensors, mark(s) is/are determined associated with video captured using camera(s) associated with the vehicle (e.g., rear camera 110) or cameras associated with vehicle event recorder 104 (e.g., inward or forward camera). The marks are provided to via network 106 to vehicle data server 108. It is determined from the marks a desired portion of video to view and viewing parameters. A request is sent to vehicle event recorder 104 to provide the portion of video using the parameters (e.g., all frames, sampled frames, etc.). The portion of the video is then displayed for the user (e.g., a user connected to vehicle data server 108 directly or indirectly over one or more networks (e.g., network 106 or other networks) using the display parameters (e.g., normal rate or accelerated rate or slow rate, etc.). Processing for determining marks is performed by vehicle event recorder 104 using trigger signals received from sensors (e.g., vehicle sensors 102, other sensors, or vehicle event recorder 104 sensors).

In some embodiments, the trigger input data is provided to a server and marks for the video are determined at the server. In some embodiments, trigger input data is received by a separate system (e.g., a telematics system) and provided to a separate system's server for mark determination and then transmitted to the vehicle data server for storage associated with a given vehicle event recorder and its data.

Vehicle event recorder 104 comprises a vehicle event recorder mounted in a vehicle (e.g., a car, a truck, a garbage truck, a trailer associated with a semi truck, a van, a bus, a commercial vehicle, a specialized truck or vehicle, etc.). Vehicle event recorder 104 is in communication with sensors 102. Sensors comprises a sets of sensors on vehicle event recorder 104 or mounted to vehicle 100—for example, one or more video recorders, audio recorders, accelerometers, gyroscopes, vehicle state sensors, proximity sensors, a global positioning system (e.g., GPS), outdoor temperature sensors, moisture sensors, laser line tracker sensors, etc. Vehicle sensors 102 comprise internal vehicle state sensors—for example a speedometer, an accelerator pedal sensor, a brake pedal sensor, an engine revolutions per minute (e.g., RPM) sensor, an engine running sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, etc. Vehicle event recorder 104 comprises a system for receiving (e.g., receiving via wired connections such as society of automotive engineers (SAE) J1939, J1708/J1587, OBD-II, CAN BUS, Ethernet, USB & e trigger input signals, etc. or wireless connections (e.g., wifi or Bluetooth™) and processing sensor data. Processing sensor data comprises filtering data, identifying patterns in data, detecting events, determining triggers, etc. Vehicle event recorder 104 is mounted on vehicle 100 in any appropriate location, for example the chassis, the front grill, the dashboard, the rear-view mirror, the rear window or wall, the floor, etc. There are times when vehicle event recorder 104 comprises multiple units mounted in different locations within vehicle 100 instead of a single unit, particularly when there are space constraints for a given location (e.g., behind the rear view mirror) and more space is required to house electronic components. Vehicle event recorder 104 comprises a communications system for communicating with network 106. Network 106 comprises a network for communications. Network 106 comprises one or more of a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, etc. There are instances when network 106 comprises multiple networks—for instance, multiple interconnected networks spanning different regions, networks operating at different times, overlaid networks with different access permissions, networks with different bandwidth, etc. Different networks comprising network 106 typically comprise different bandwidth cost (e.g., a wired network has a very low cost, a wireless Ethernet connection has a moderate cost, a cellular data network has a high cost). In some embodiments, network 106 has a different cost at different times (e.g., a higher cost during the day and a lower cost at night). Vehicle event recorder 104 communicates with vehicle data server 108 via network 106.

Vehicle data server 108 comprises a vehicle data server for communicating with vehicle event recorder 104 via network 106. Vehicle data server 108 receives data, processes data, stores data, requests more data, provides stored data, provides data for display, interacts with users, etc. Video data received by vehicle data server 108 is stored in a database. Vehicle event recorder 104 supports hibernation to save vehicle battery when recording isn't needed. Vehicle event recorder 104 is typically on when ignition is on and then the client or user determines how long to continue recording when ignition is turned off until the hibernation delay timer expires and vehicle event recorder 104 goes into low power hibernation mode. The client or user configures the recording time when ignition is off via vehicle data server 108. The efficient browsing system supports waking vehicle event recorder 104 up from hibernation to support the efficient browse modes (e.g., to enable streaming or transfer of video data) based on a user request within vehicle data server 108.

Figure 2:
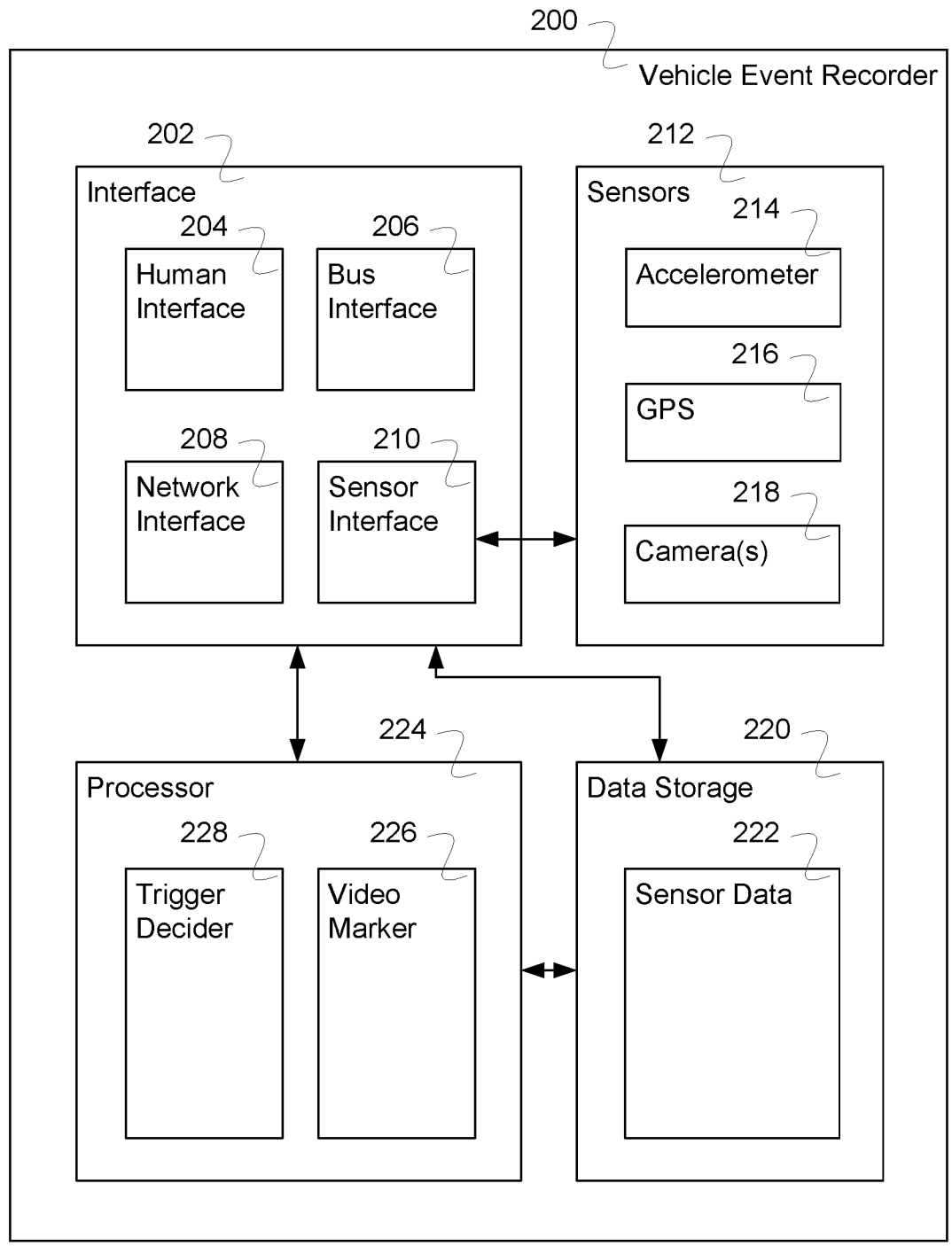
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 102 of FIG. 1. In the example shown, vehicle event recorder 200 processes sensor data using processor 224. Processor 224 receives sensor data via bus interface 206 of interface 202 or sensor interface 210 and from internal sensors (e.g., GPS 216, accelerometer 214, or camera(s) 218 of sensors 212). After receiving a sensor signal of interest, a trigger is determined. Processor 224 determines a decision using trigger decider 228 and marks video using video marker 226. The marks are provided to a vehicle data server.

In some embodiments, the trigger input data is provided to a server and marks for the video are determined at the server (e.g., a vehicle data server or a third party server or a separate system server) and then the marks are delivered, if necessary, to a vehicle data server.

Vehicle event recorder 200 comprises interface 202. Interface 202 comprises a set of interfaces to other systems. Human interface 204 comprises an interface to a human interaction system—for example, an audio output, a display output, etc. Bus interface 206 comprises an interface to a bus for receiving data from one or more vehicle state sensors coupled electrically to a bus. Sensor interface 210 comprises an interface to one or more vehicle event recorder sensors. In various embodiments, vehicle event recorder sensors (e.g., sensors 212) comprise an exterior video camera (e.g., camera(s) 218), an exterior still camera (e.g., camera(s) 218), an interior video camera (e.g., camera(s) 218), an interior still camera (e.g., camera(s) 218), a microphone, an accelerometer (e.g., accelerometer 214), a gyroscope, an outdoor temperature sensor, a moisture sensor, a laser line tracker sensor, vehicle state sensors, positioning sensor (e.g., GPS 216), a switched sensor (e.g., contact switch or relay output) or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, shocks sensors, an engine exhaust sensor, a gear position sensor, a turn signal sensor, a cabin equipment operation sensor, or any other appropriate vehicle state sensors. In some embodiments, bus interface 206 comprises a vehicle bus (e.g., society of automotive engineers (SAE) J1939, J1708/J1587, OBD-II, CAN BUS, etc.). In some embodiments, vehicle event recorder 300 communicates with vehicle state sensors via the vehicle bus.

Bus interface 206 comprises an interface to one or more vehicle control systems (e.g., for adjusting vehicle control parameters, for putting the vehicle in a safe mode, for adjusting an automatic driving control parameter, etc.). Network interface 208 comprises a network interface for communicating with other systems via a network (e.g., network 106 of FIG. 1). Network interface 208 comprises one or more of a GSM interface, a CDMA interface, an LTE interface, a WiFi™ interface, an Ethernet interface, a Universal Serial Bus (USB) interface, a Bluetooth™ interface, an Internet interface, etc. Processor 224 comprises a processor for controlling the operations of vehicle event recorder 200, for reading and writing information on data storage 220 (e.g., sensor data in sensor data 222), for reading and/or writing data via interface 202, etc. Processor 224 comprises an event detector for determining events from data (e.g., video data, sensor data, etc.), deciding triggers with trigger decider 228, and video markers using video marker 226.

Data storage 220 comprises a data storage (e.g., a random access memory (RAM), a read only memory (ROM), a nonvolatile memory, a flash memory, a hard disk, or any other appropriate data storage). Data storage 220 comprises a data storage for storing instructions for processor 224, vehicle event recorder data, vehicle event data, sensor data, video data, vehicle information, vehicle identifying information, anomalous event information, etc. Data storage 220 stores continuous video data or other sensor data comprising stored continuous video data from one or more cameras mounted on the vehicle for a previous time period (e.g., 1 minute, 5 minutes, 1 hour, 1 day, etc.).

Figure 3:
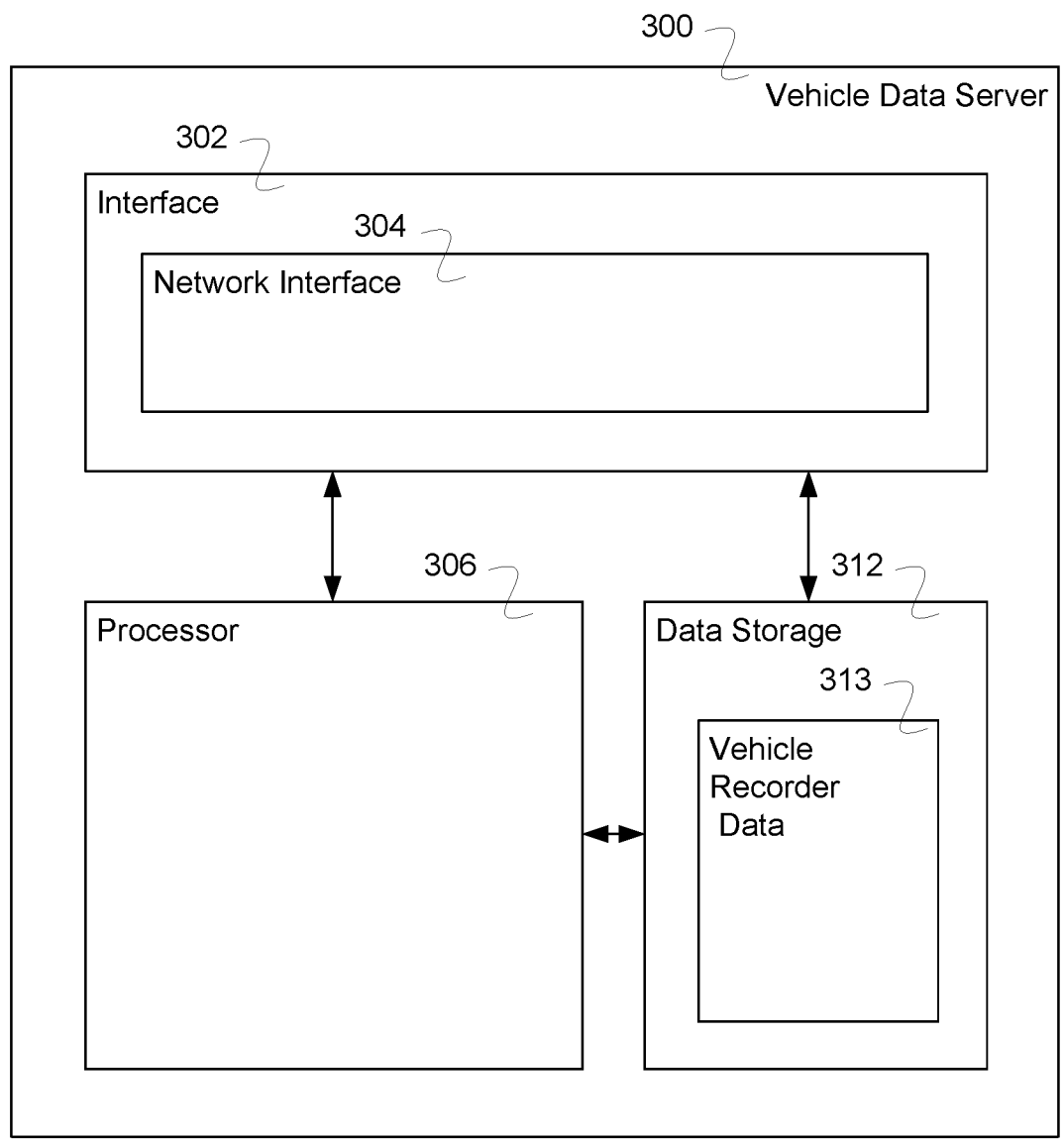
FIG. 3 is a block diagram illustrating an embodiment of a vehicle data server.

FIG. 3 is a block diagram illustrating an embodiment of a vehicle data server. In some embodiments, vehicle data server 300 comprises vehicle data server 108 of FIG. 1. In the example shown, vehicle data server 300 receives a set of marks via network interface 304 of interface 302. Processor 306 interacts with a user to determine whether an efficient video browsing mode is being used and based on that decision, provides appropriate marks for efficient video viewing. Marks and parameters are selected and this causes retrieval of a portion of video from an appropriate vehicle event recorder at an appropriate rate (e.g., full rate, sampled rate, etc.). The portion of the video is then played for the user according to selected parameters (e.g., normal rate, accelerated rate, etc.).

In some embodiments, the trigger input data is provided to vehicle data server 300 and marks for the video are determined at vehicle data server 300.

Figure 4A:
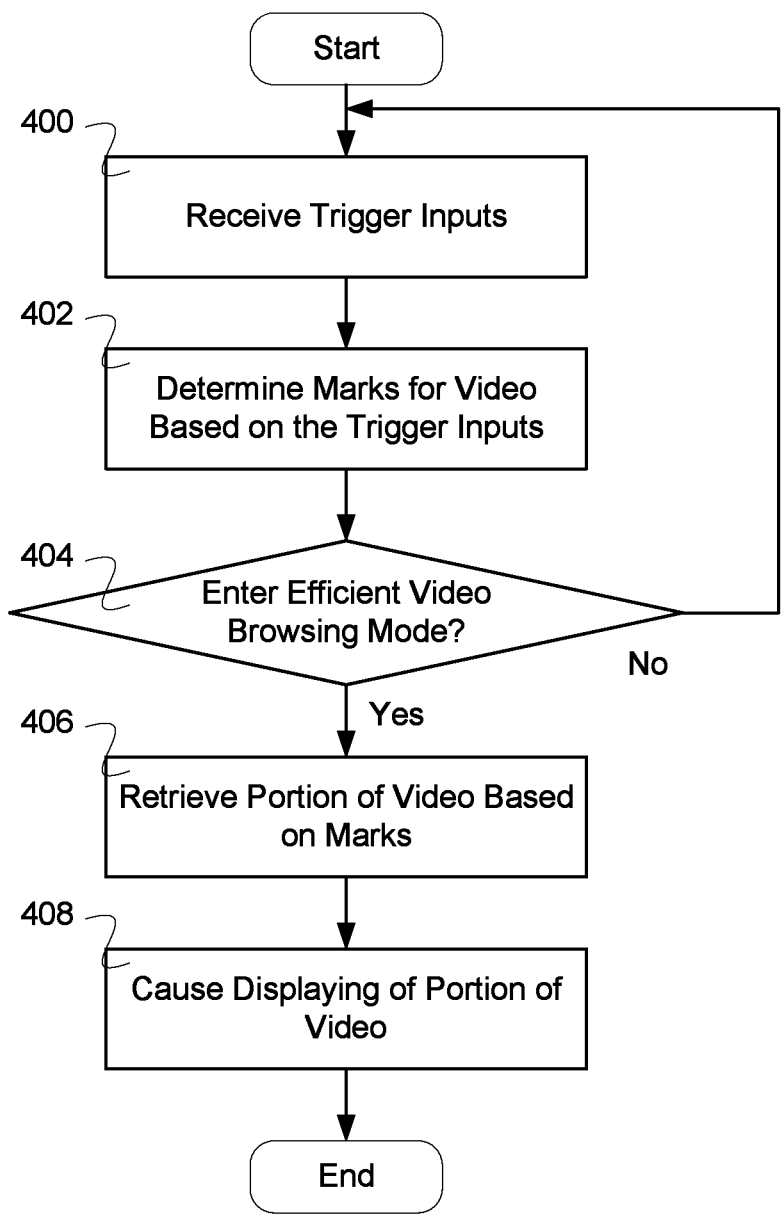
FIG. 4A is a flow diagram illustrating an embodiment of a process for efficient video browsing.

FIG. 4A is a flow diagram illustrating an embodiment of a process for efficient video browsing. In some embodiments, the process of FIG. 4A is executed using a vehicle data server (e.g., vehicle data server 108 of FIG. 1). In the example shown, in 400 trigger inputs are received. For example, a sensor signal input is received. In 402, marks are determined for video based on the trigger inputs. For example, one or more trigger inputs are used to determine a mark for a video data stream. In 404, it is determined whether to enter an efficient video browsing mode. For example, a button is pushed to indicate that a specialized video browsing mode is to be used. In response to determining that an efficient video browsing mode is entered, in 406 a portion of video is retrieved based on marks. For example, a request is made to retrieve a portion of a video data stream from a vehicle event recorder based on one or more marks. In 408, displaying of a portion of the video is caused. For example, the server causes video to be displayed in a user interface window. In response to the determining that an efficient video browsing mode is not entered, control is passed to 400.

Figure 4B:
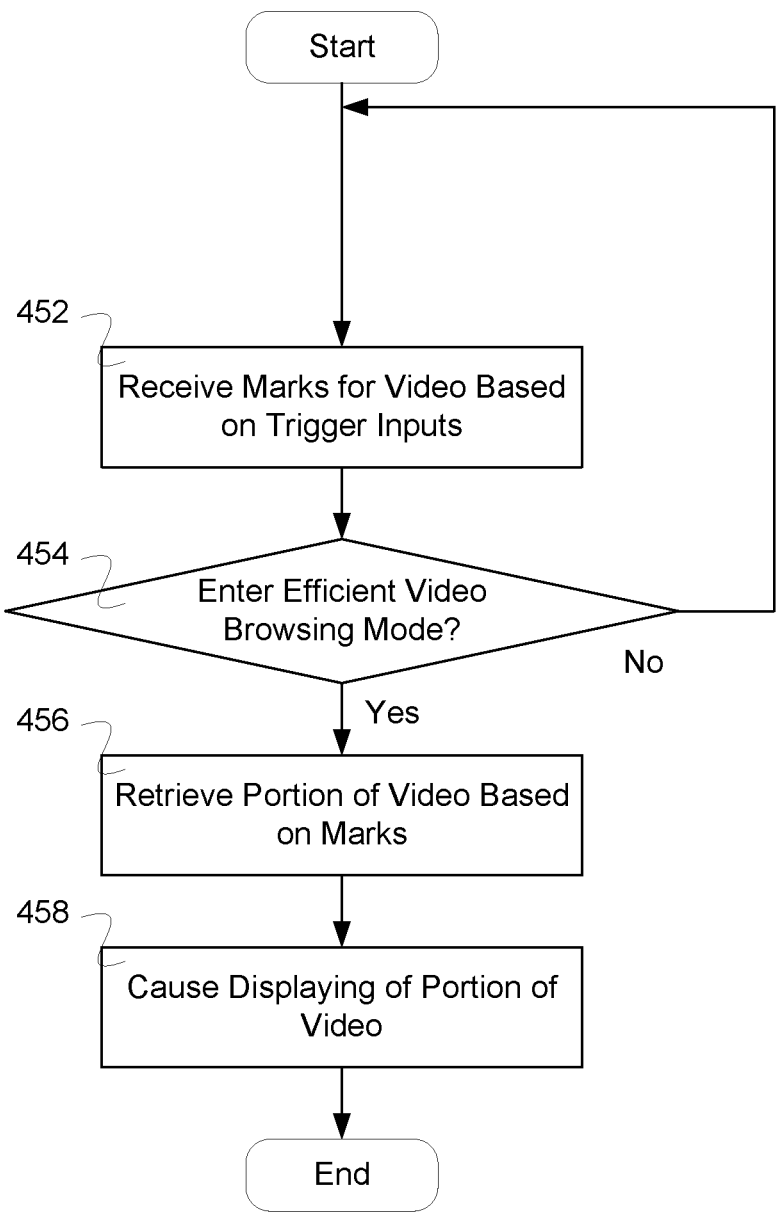
FIG. 4B is a flow diagram illustrating an embodiment of a process for efficient video browsing.

FIG. 4B is a flow diagram illustrating an embodiment of a process for efficient video browsing. In some embodiments, the process of FIG. 4B is executed using a vehicle data server (e.g., vehicle data server 108 of FIG. 1). In the example shown, in 452, marks are determined for video based on the trigger inputs. For example, one or more trigger inputs are used to determine a mark for a video data stream. In 454, it is determined whether to enter an efficient video browsing mode. For example, a button is pushed to indicate that a specialized video browsing mode is to be used. In response to determining that an efficient video browsing mode is entered, in 456 a portion of video is retrieved based on marks. For example, a request is made to retrieve a portion of a video data stream from a vehicle event recorder based on one or more marks. In 458, displaying of a portion of the video is caused. For example, the server causes video to be displayed in a user interface window. In response to the determining that an efficient video browsing mode is not entered, control is passed to 452.

Figure 5:
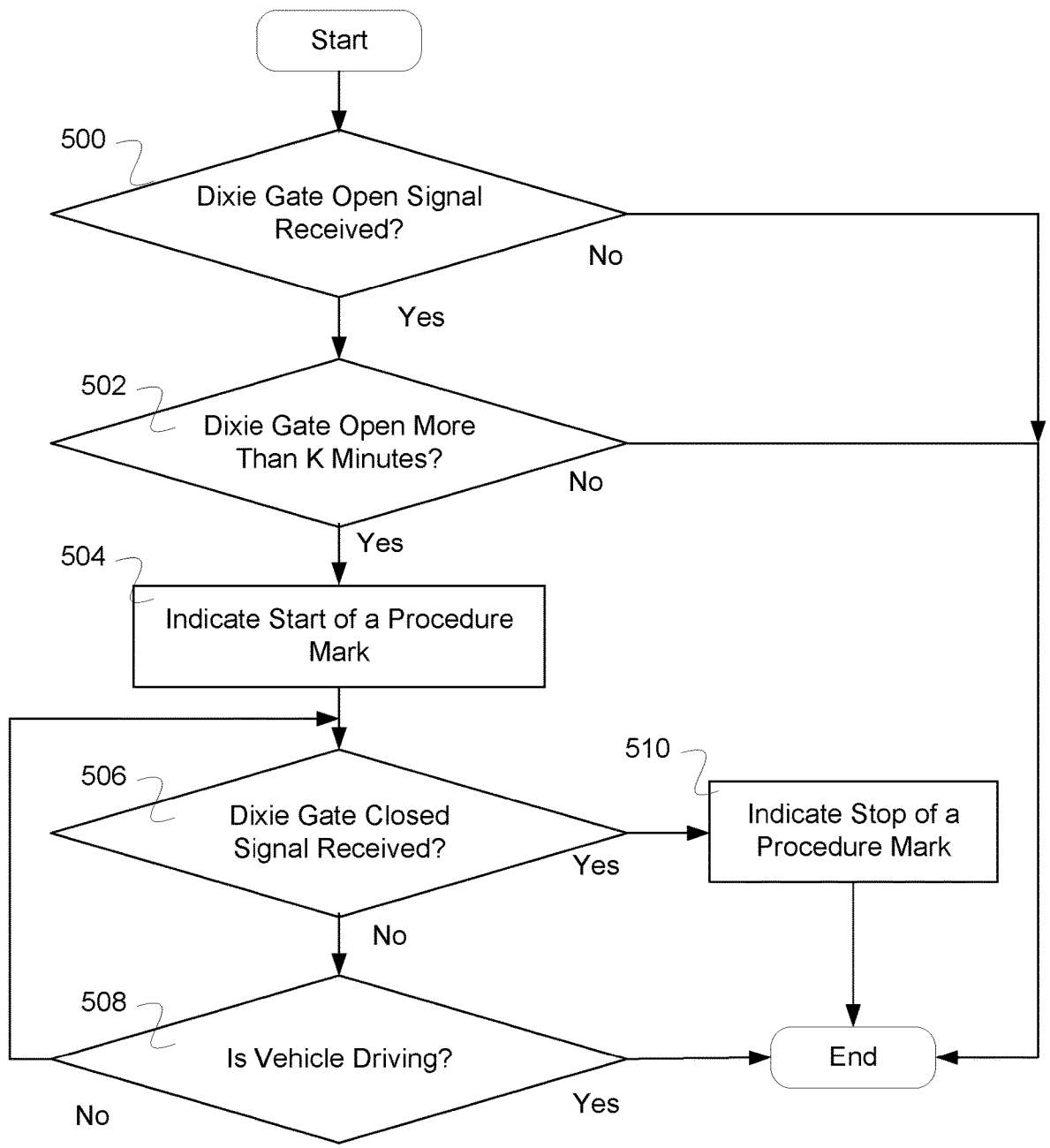
FIG. 5 is flow diagram illustrating an embodiment of a process for determining a mark.

FIG. 5 is flow diagram illustrating an embodiment of a process for determining a mark. In some embodiments, the process of FIG. 5 is implemented using a processor on a vehicle event recorder (e.g., vehicle event recorder 104 of FIG. 1). In the example shown, in 500 it is determined whether a dixie gate open signal is received. In the event that a dixie gate open signal is not received, the process ends. In the event that a dixie gate open signal is received, then in 502 it is determined whether the dixie gate is open more than K minutes. For example, it is determined whether the dixie gate is open more than K minutes, where K is an integer (e.g., k is 1, 2, 3, 4, 5, 6, 7, 8, 9, 10, 20, 30, or any other integer). In the event that the dixie gate is not open more than K minutes, the process ends. In the event that the dixie gate is open more than K minutes, in 504 a start of a procedure mark is indicated. In 506, it is determined whether a dixie gate closed signal is received. In the event that a dixie gate closed signal is received, then in 510 a stop of a procedure mark is indicated and the process ends. In the event that that a dixie gate signal is not received, then in 508 it is determined whether the vehicle is driving. In the event that the vehicle is not driving, then control passes to 506. In the event that the vehicle is driving, then the process ends.

In the example of FIG. 5, the mark is actually a single mark with the start of the mark indicating the dixie gate opening and the end or stop of the mark indicating the dixie gate closing. Since the opening the dixie gate sends a signal setting the brake interlock, the signal setting the brake interlock can be used as a dixie gate open signal. Therefore the setting of the brake interlock marks the start of the procedure and, similarly, the stop of the brake interlock signal marks the stop of the procedure mark. The test for eliminating accidental or test openings of the dixie gate uses a time open length threshold of K minutes.

Figure 6:
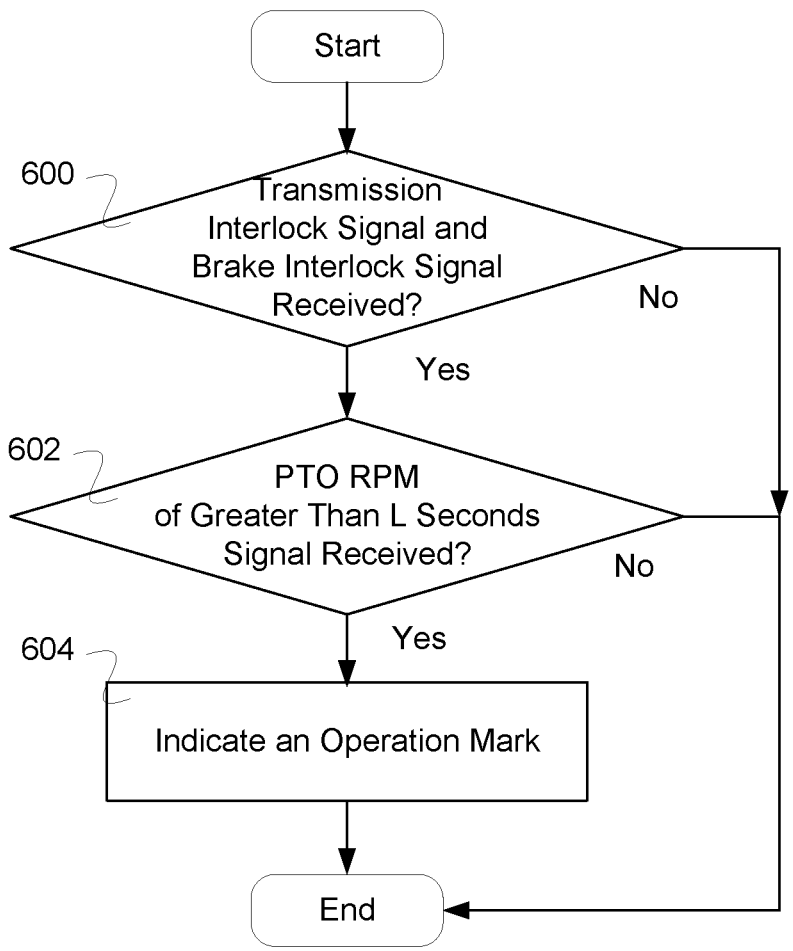
FIG. 6 is a flow diagram illustrating an embodiment of a process for determining a mark.

FIG. 6 is a flow diagram illustrating an embodiment of a process for determining a mark. In some embodiments, the process of FIG. 6 is implemented using a processor on a vehicle event recorder (e.g., vehicle event recorder 104 of FIG. 1) or a vehicle data server (e.g., vehicle data server 108 of FIG. 1). In the example shown, in 600 it is determined whether a transmission interlock signal and a brake interlock signal are received. In response to a transmission interlock and a brake interlock signal not being received, the process ends. In response to a transmission interlock signal and a brake interlock signal being received, in 602 it is determined whether a power take off revolutions per minute (PTO RPM) of greater than L seconds signal is received. For example, determining whether a PTO RPM signal of greater than L seconds was received, where L is an integer (e.g., 1, 2, 3, 4, 5, 10, 15, 20, or any other appropriate number of seconds). In response to a PTO RPM of greater than L seconds signal not being received, the process ends. In response to a PTO RPM of greater than L seconds signal being received, in 604. an operation mark is indicated. For example, in the event that a transmission interlock signal and a brake signal are received and subsequently a PTO RPM signal of duration greater than 15 seconds is received, then a determination is made that an operation procedure is occurring.

In various embodiments, a mark indicates a start of an event of interest, a mark indicates a stop of an event of interest, a mark spans an event of interest, or any other appropriate correspondence between a mark and an event of interest.

Figure 7A:
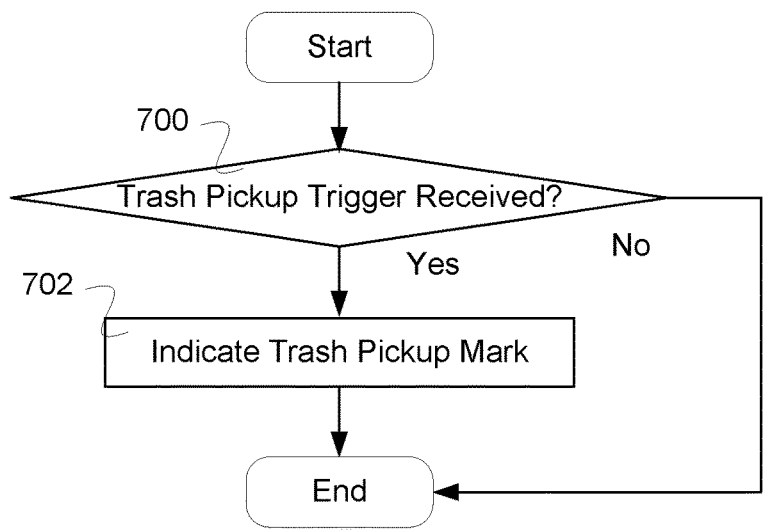
FIG. 7A is a flow diagram illustrating an embodiment of a process for determining a mark.

FIG. 7A is a flow diagram illustrating an embodiment of a process for determining a mark. In some embodiments, the process of FIG. 7A is implemented using a processor on a vehicle event recorder (e.g., vehicle event recorder 104 of FIG. 1) or a vehicle data server (e.g., vehicle data server 108 of FIG. 1). In the example shown, in 700 it is determined whether a trash pickup trigger is received. In response to the trash pickup trigger being received, in 702 a trash pickup mark is indicated. For example, in the case of a commercial front loading trash truck, when a vehicle velocity signal indicates that the vehicle is not moving for at least M seconds (e.g., where M is 12) and a PTO RPM signal indicates engagement of the a vehicle system such as the dumpster lift arms, then indicate a trash pickup mark. In response to the trash pickup trigger not being received, then the process ends.

Figure 7B:
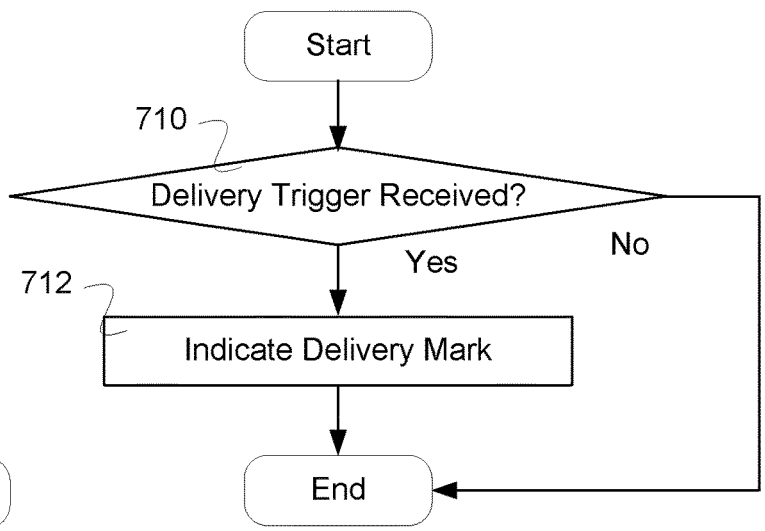
FIG. 7B is a flow diagram illustrating an embodiment of a process for determining a mark.

FIG. 7B is a flow diagram illustrating an embodiment of a process for determining a mark. In some embodiments, the process of FIG. 7B is implemented using a processor on a vehicle event recorder (e.g., vehicle event recorder 104 of FIG. 1) or a vehicle data server (e.g., vehicle data server 108 of FIG. 1). In the example shown, in 710 it is determined whether a delivery trigger is received. In response to the delivery trigger being received, in 712 a delivery mark is indicated. For example, when the GPS sensor data indicates that a vehicle is within a geofence for a client site and a cargo door open trigger is received while the vehicles is within the geofence, then indicate a delivery mark. In response to the delivery trigger not being received, then the process ends.

Figure 7C:
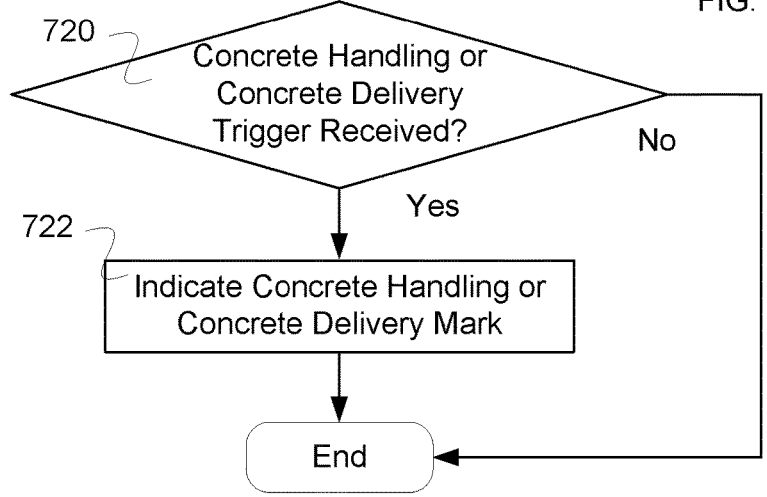
FIG. 7C is a flow diagram illustrating an embodiment of a process for determining a mark.

FIG. 7C is a flow diagram illustrating an embodiment of a process for determining a mark. In some embodiments, the process of FIG. 7C is implemented using a processor on a vehicle event recorder (e.g., vehicle event recorder 104 of FIG. 1) or a vehicle data server (e.g., vehicle data server 108 of FIG. 1). In the example shown, in 720 it is determined whether a concrete handling or concrete delivery trigger is received. In response to the concrete handling or concrete delivery trigger being received, in 722 a concrete handling or concrete delivery mark is indicated. For example, when the GPS sensor data indicates that a vehicle is within a geofence for a client site and a concrete pour trigger is received while the vehicles is within the geofence, then indicate a concrete handling or concrete delivery mark. In response to the concrete handling or concrete delivery trigger not being received, then the process ends.

Figure 8:
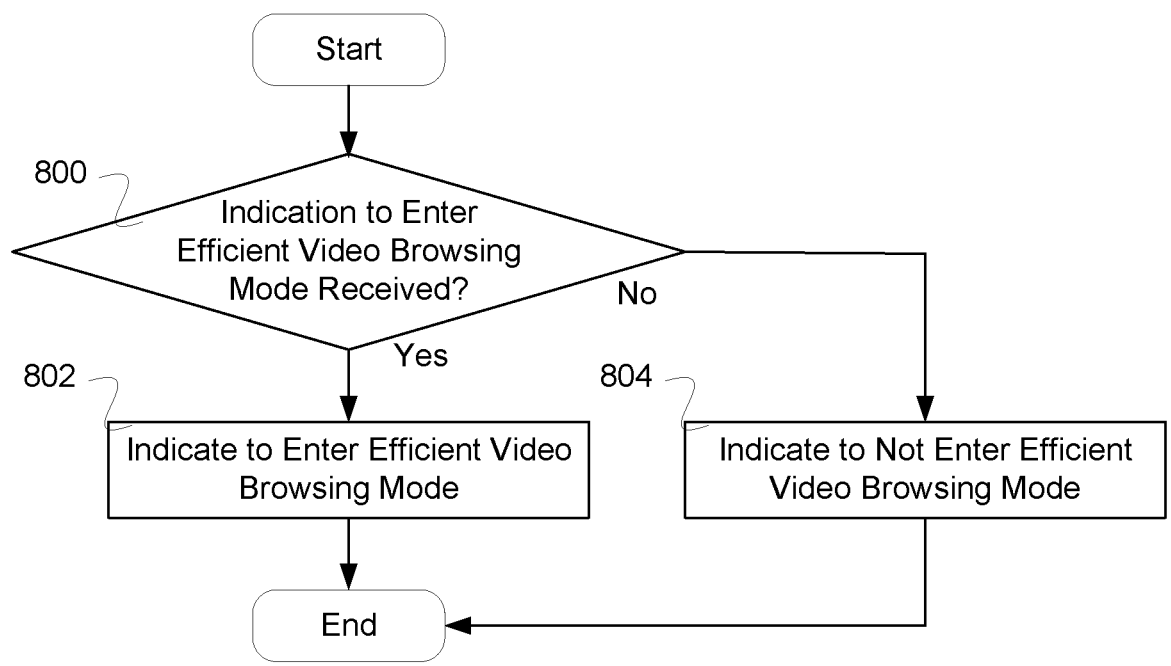
FIG. 8 is a flow diagram illustrating an embodiment of a process for determining entering efficient video browsing mode.

FIG. 8 is a flow diagram illustrating an embodiment of a process for determining entering efficient video browsing mode. In some embodiments, the process of FIG. 8 is used to implement step 404 of FIG. 4A or step 454 of FIG. 4B. In the example shown, in 800 it is determined whether an indication to enter an efficient video browsing mode is received. In response to an indication to enter an efficient video browsing mode being received, then in 802 it is indicated to enter an efficient video browsing mode. For example, the user interface displays marks to more easily identify portions of a video data stream to review or store from a selected video recorder. In response to an indication to enter an efficient video browsing mode not being received, in 804 it is indicated that an efficient video browsing mode is note entered. For example, no marks are provided for efficient navigation of the video stream available for viewing.

Figure 9:
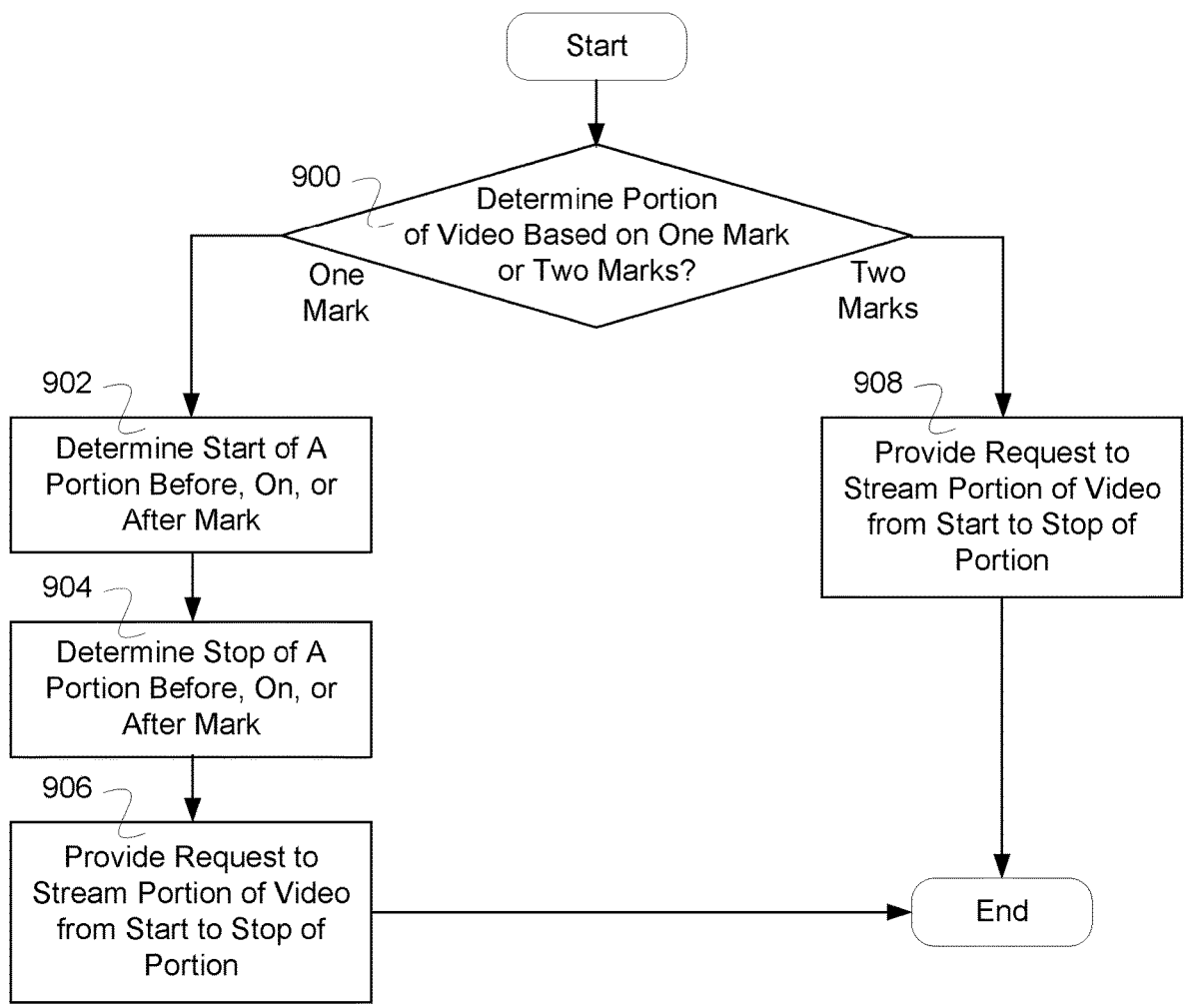
FIG. 9 is a flow diagram illustrating an embodiment of a process for determining a portion of video to retrieve.

FIG. 9 is a flow diagram illustrating an embodiment of a process for determining a portion of video to retrieve. In some embodiments, the process of FIG. 9 is used to implement 406 of FIG. 4A or 456 of FIG. 4B. In the example shown, in 900 it is determined whether a portion of video is based on one mark or two marks. In response to the portion of video being based on one mark, in 902 a start of a portion is determined to be either before, on, or after a mark. In 904 a stop of a portion is determined to be either before, on, or after a mark. In 906, a request is provided to stream a portion of video from the start to the stop of the portion. In response to the portion of video being based on two marks, in 908 a request to stream a portion of video from start to stop of portion.

Figure 10:
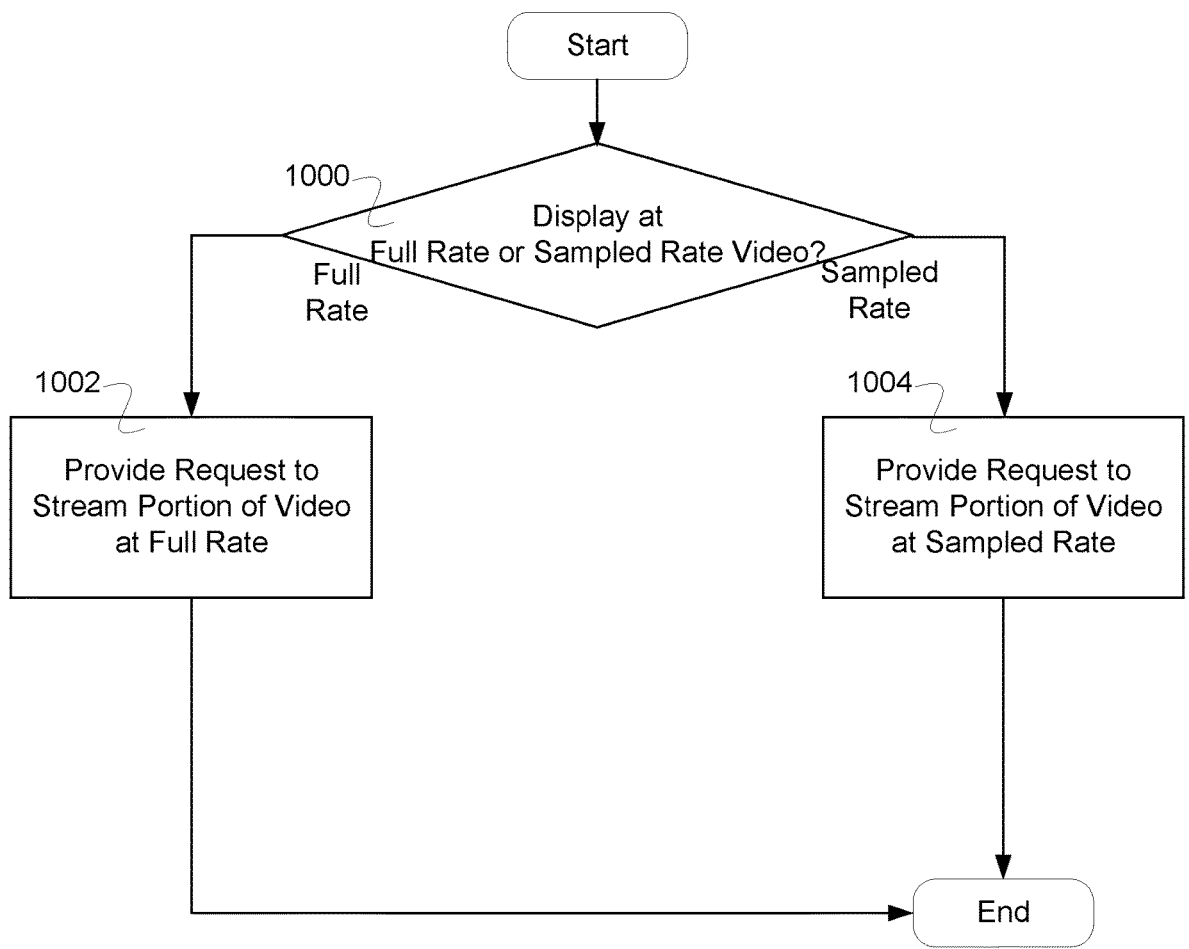
FIG. 10 is a flow diagram illustrating an embodiment of a process for causing retrieval of the portion of video.

FIG. 10 is a flow diagram illustrating an embodiment of a process for causing retrieval of the portion of video. In some embodiments, the process of FIG. 10 is used to implement 406 of FIG. 4A or 456 of FIG. 4B. In the example shown, in 1000 it is determined whether displaying is at full rate or a sampled rate. In response to determining to display at fill rate, in 1002 a request is provided to stream the portion of video at full rate. In response to determining to display at a sampled rate, in 1004 a request is provided to stream a portion of video at a sampled rate.

Figure 11:
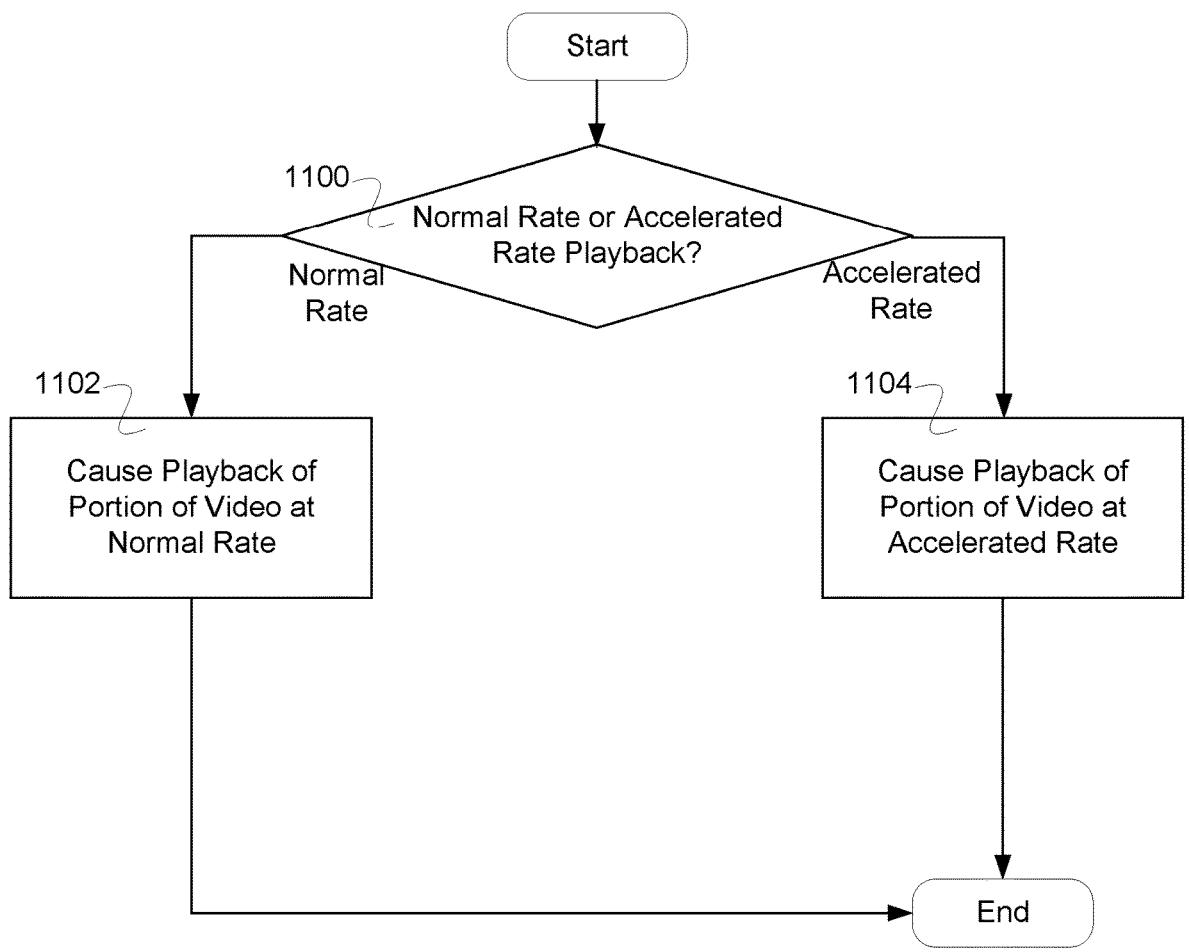
FIG. 11 is a flow diagram illustrating an embodiment of a process for causing display of the portion of video.

FIG. 11 is a flow diagram illustrating an embodiment of a process for causing display of the portion of video. In some embodiments, the process of FIG. 11 is used to implement 408 of FIG. 4A or 458 of FIG. 4B. In the example shown, in 1100 it is determined whether playback is at normal rate or accelerated rate. In response to determining to playback is at normal rate, in 1102 playback of a portion of video is caused at a normal rate. In response to determining to playback at an accelerated rate, in 1104 a playback of a portion of video at an accelerated rate.

Figure 12:
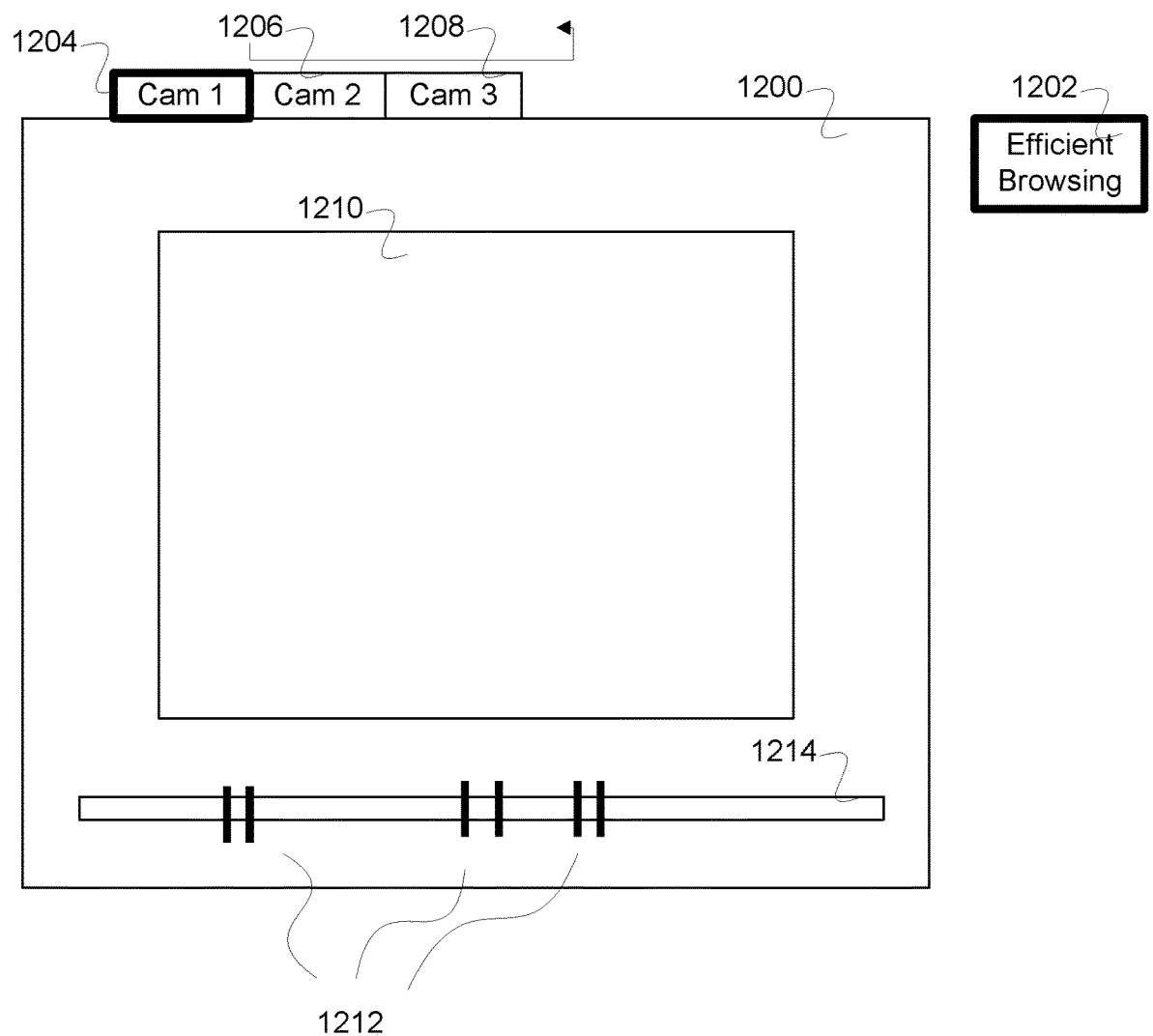
FIG. 12 is a diagram illustrating an embodiment of a user interface for efficient video browsing.

FIG. 12 is a diagram illustrating an embodiment of a user interface for efficient video browsing. In some embodiments, user interface 1200 is used for displaying a portion of video data. In the example shown, user interface 1200 displays video from a camera (e.g., cam 1 1204, cam 2 1206, or cam 3 1208) in display window 1210. An indication is made by a user to enter and efficient browsing mode (e.g., by pushing efficient browsing button 1202). Video timeline bar 1214 indicates available video for playback and marks 1212 show where trigger conditions were met. This enables a user to select video around a mark, before a mark, after a mark, between a mark to view. The marks indicate an area that is more likely to include a desired incident or occurrence thus making reviewing of video more efficient. The marks of triggers could also be represented in a dataset form (e.g., a list, a menu, etc.) where the user could select the data marker to efficiently sample the content for video retrieval. In some embodiments, additional user interface buttons or other selectable user interface items are present for selecting video rate and display rate.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system for efficient video browsing, comprising;
   an interface configured to:
      receive marks for a video, wherein marks for a video are determined based at least in part on trigger inputs, wherein the trigger inputs comprise a dixie gate signal or a brake interlock signal, and wherein the trigger inputs are used to determine one of the following procedure marks: a start fuel pickup procedure mark, a stop fuel pickup procedure mark, a start fuel delivery procedure mark, a stop fuel delivery procedure mark, a start hazmat pickup procedure mark, a stop hazmat pickup procedure mark, a start hazmat delivery procedure mark, or a stop hazmat delivery procedure mark;

a processor configured to:
  determine whether to enter an efficient video browsing mode; and
  in response to determining to enter the efficient video browsing mode:
    retrieve a portion of the video based at least in part on the marks; and
    cause displaying of the portion of the video.

2. The system as in claim 1, wherein the trigger inputs comprise a brake interlock signal, a transmission interlock signal, and/or a PTO RPM signal.

3. The system as in claim 2, wherein the trigger inputs are used to determine one of the following operation marks: a start of operation mark or a stop of operation mark.

4. The system as in claim 1, wherein a mark of the marks comprises a trash pickup mark based at least in part on one or more of the following trigger inputs: a waste lift arm pneumatic actuation sensor signal, a waste lift arm electric actuation sensor signal, a RFID bin ID signal, an accelerometer signal, a following distance signal, a lane departure signal, a rolling stop signal, an engine RPM signal, and a speed signal.

5. The system as in claim 1, wherein a mark of the marks comprises a delivery mark based at least in part on one or more of the following trigger inputs: a cargo door open signal, a cargo door closed signal, a geofence crossing signal, a passenger pickup signal, an accelerometer signal, a following distance signal, a lane departure signal, a rolling stop signal, an engine RPM signal, and a speed signal.

6. The system as in claim 1, wherein a mark of the marks comprises a concrete handling or concrete delivery mark based at least in part on one or more of the following trigger inputs: a concrete water adding signal, a concrete pouring signal, a brake interlock signal, an accelerometer signal, a following distance signal, a lane departure signal, a rolling stop signal, an engine RPM signal, and a speed signal.

7. The system as in claim 1, wherein receiving the portion of the video comprises receiving a stream of the portion of the video.

8. The system as in claim 1, wherein the portion of the video comprises video data between two marks.

9. The system as in claim 8, wherein the video data is full rate video data.

10. The system as in claim 8, wherein the video data is sample rate video data.

11. The system as in claim 10, wherein the sample rate video data is 1 out of N frames, where N comprises an integer greater than or equal to 2.

12. The system as in claim 1, wherein displaying of the portion of the video is at an accelerated rate.

13. The system as in claim 12, wherein the accelerated rate comprises an M times multiplied rate.

14. The system as in claim 1, wherein determining whether to enter an efficient video browsing mode comprises determining whether an indication to enter an efficient video browsing mode has been received.

15. The system as in claim 14, wherein the indication results from a user indication to enter an efficient video browsing mode by one of the following: a button push, a menu selection, a tab selection, a radio button selection, a toggle selection, or a checkbox selection.

16. The system as in claim 1, wherein determining whether to enter an efficient video browsing mode comprises automatically determining that an efficient video mode is to be entered.

17. A method of efficient video browsing, comprising:
  receiving marks for a video, wherein marks for a video are determined based at least in part on trigger inputs, wherein the trigger inputs comprise a dixie gate signal or a brake interlock signal, and wherein the trigger inputs are used to determine one of the following procedure marks: a start fuel pickup procedure mark, a stop fuel pickup procedure mark, a start fuel delivery procedure mark, a stop fuel delivery procedure mark, a start hazmat pickup procedure mark, a stop hazmat pickup procedure mark, a start hazmat delivery procedure mark, or a stop hazmat delivery procedure mark;
  determine whether to enter an efficient video browsing mode; and
  in response to determining to enter the efficient video browsing mode:
    retrieve a portion of the video based at least in part on the marks; and
    cause displaying of the portion of the video.

18. A computer program product for efficient video browsing, the computer program product being embodied in a non-transitory computer readable storage medium and comprising computer instructions for:
  receiving marks for a video, wherein marks for a video are determined based at least in part on trigger inputs, wherein the trigger inputs comprise a dixie gate signal or a brake interlock signal, and wherein the trigger inputs are used to determine one of the following procedure marks: a start fuel pickup procedure mark, a stop fuel pickup procedure mark, a start fuel delivery procedure mark, a stop fuel delivery procedure mark, a start hazmat pickup procedure mark, a stop hazmat pickup procedure mark, a start hazmat delivery procedure mark, or a stop hazmat delivery procedure mark;
  determine whether to enter an efficient video browsing mode; and
  in response to determining to enter the efficient video browsing mode:
    retrieve a portion of the video based at least in part on the marks; and
    cause displaying of the portion of the video.

* * * * *